United States Patent [19]

Swager

[11] 4,059,871
[45] Nov. 29, 1977

[54] CLAMPING DEVICE WITH LOCKING TRIGGER ARM

[76] Inventor: William E. Swager, P.O. Box 656, Fremont, Ind. 46737

[21] Appl. No.: 724,262

[22] Filed: Sept. 17, 1976

[51] Int. Cl.² ............................................. F16G 11/10
[52] U.S. Cl. ...................................... 24/134 R; 182/5; 182/8
[58] Field of Search ....... 24/134 R, 134 KB, 134 KC, 24/134 KD, 134 L, 132 WL, 254; 182/5, 8

[56] References Cited

U.S. PATENT DOCUMENTS 59,085  10/1866  Singlair ............................ 24/134 R

FOREIGN PATENT DOCUMENTS 625,481  8/1961  Canada ............................ 24/133

Primary Examiner—Bernard A. Gelak

[57] ABSTRACT

This invention relates to a clamping device slidably supported upon an elongated body such as a cable, bar, tube or the like, in a sliding cylinder of selected size to accommodate the elongated body, the device having a pivotally supported cam-like surface to lockingly engage and clamp the elongated body in fixed clamped position upon the elongated body, and includes means for locking the clamping cam out of engagement with the elongated body, whereby ascent of a climber allows the clamping device to be drawn upward or downward as the climber ascends or descends a ladder or the like holding the clamping cam disengaged but easily released from its locking means for quick clamping engagement of the elongated body by any quick pull, by misstep and for safe support of the climber in clamping engagement of said elongated body, rope or the like.

7 Claims, 8 Drawing Figures

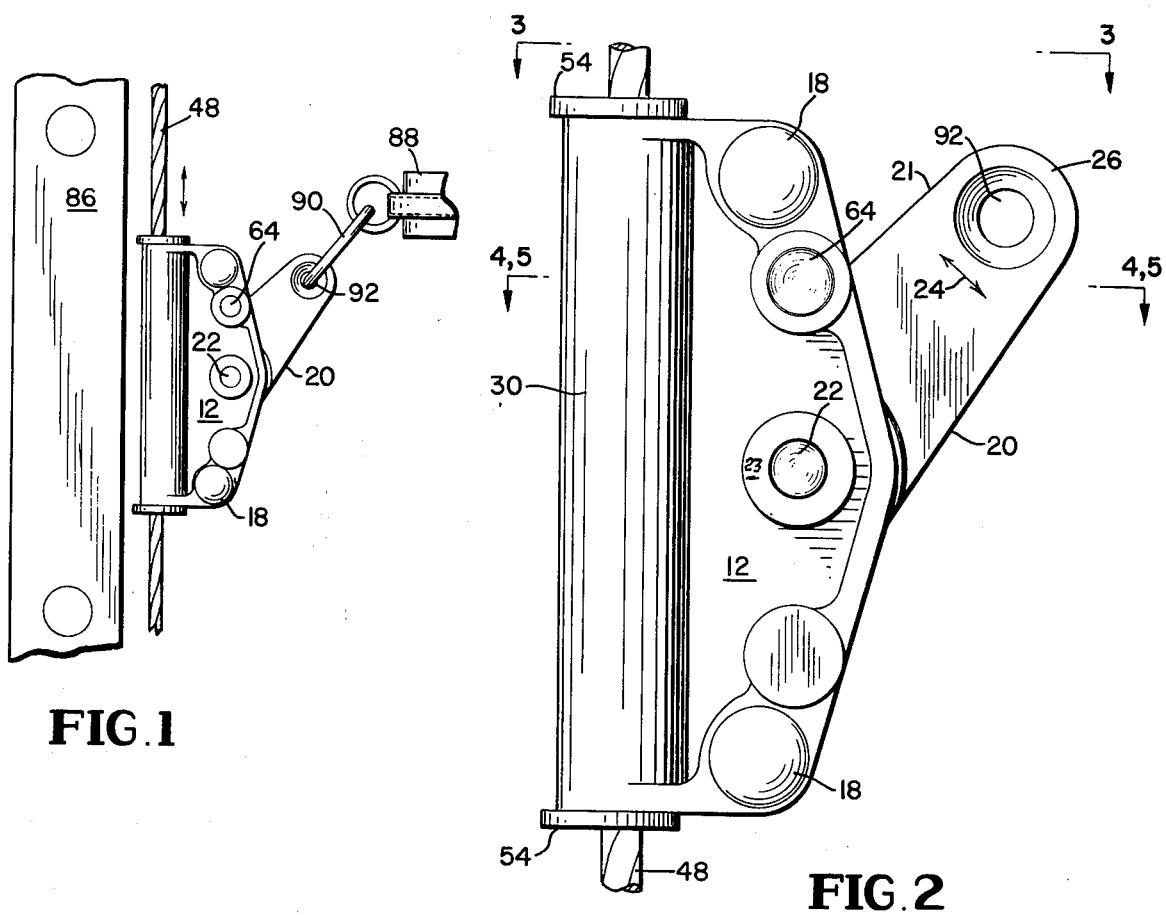
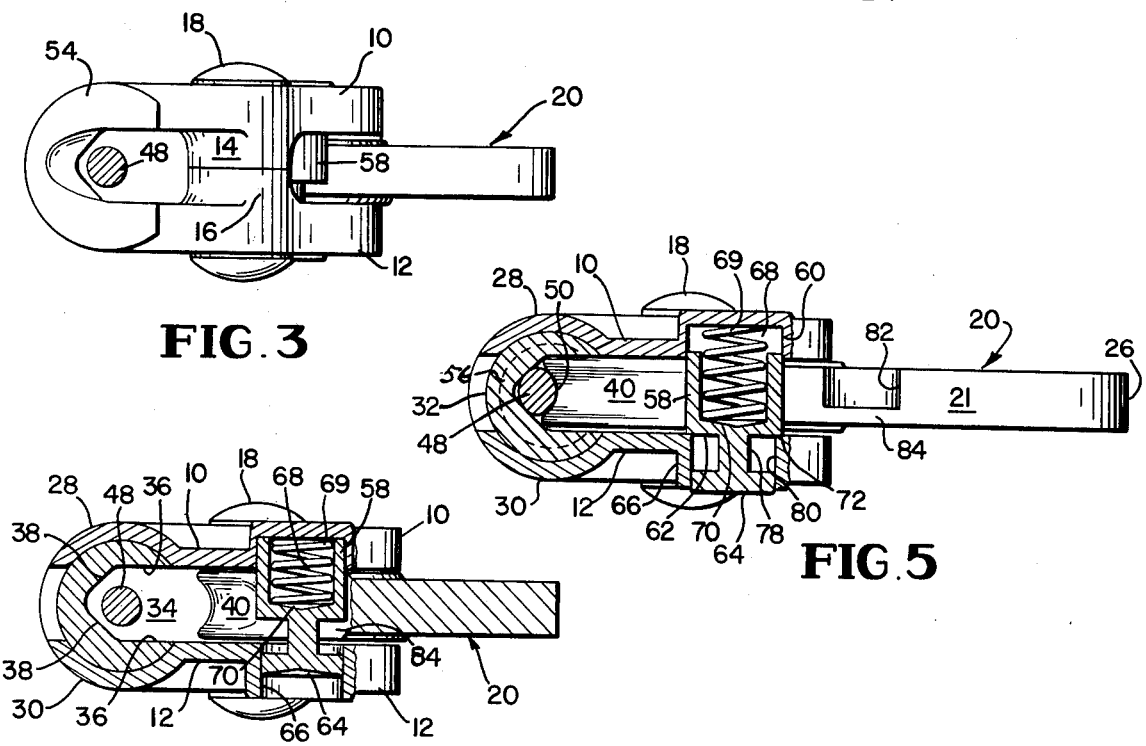

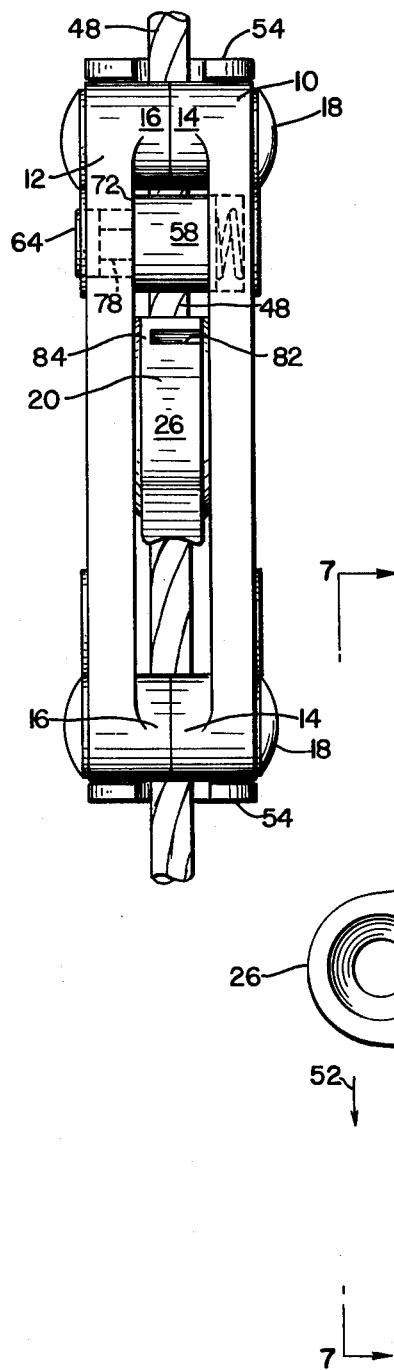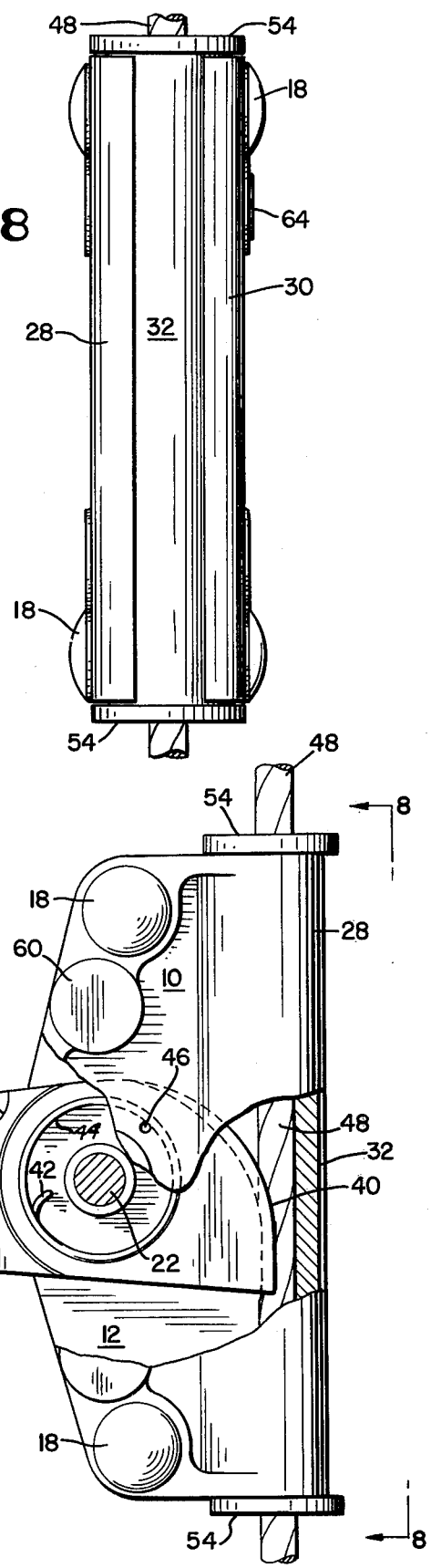

CLAMPING DEVICE WITH LOCKING TRIGGER ARM

This invention relates to a clamping device for slidably mounting upon an annular elongated body, such as a rope, cable, tube, bar or the like, and having a pivotally supported clamping means, such as a bar having a cam-shaped surface at one end to engage and clamp to the elongated body, and a trigger arm at the other, extending outward from the clamping body, for securing the device to the belt of a climber slidably conveying the clamping device upon the elongated body mounted near a ladder upon which the climber ascends or descends for safety purposes. More particularly the invention relates to a clamping device for a climber in which an outwardly extending trigger arm is pivotally supported and spring-biased into clamping engagement upon the elongated body, and the device includes means by which the gripping cam surface is temporarily latched or fastened out of clamping engagement with said elongated body, thus allowing easy vertical sliding movement of the clamping device on the elongated body with the climber as he ascends or descends the ladder.

Various clamping means for an elongated body, such as a rope or cable, mounted near a ladder may have a safety supported cam-like clamping means supported near or bearing against the rope or cable for actuation and movement through an outwardly extending trigger arm and the clamping device is pulled upward or downward by the climber. For safety purposes the cam-like arm may be spring-biased into gripping engagement with the elongated body, such as shown in my co-pending application Ser. No. 688,145, filed May 20, 1976 (SWA 603). In that construction the biasing pressure on the cam for clamping against the elongated body is partially offset by the weight of the clamping means in ascending or descending movement. The spring-like biasing pressure is usually small so that with any minor frictional impairment of easy pivotal movement of the cam, and with variation of the size of the clamp, the sliding movement and the triggering of the clamp upon the elongated body is not always easily controlled.

According to the present invention, the clamping device has a slidable spring-biased latching, clamping bolt, piston or locking pin mounted to bear frictionally against a surface position of the trigger arm, manually operable for latching thereagainst in a disposed cup therein to hold the trigger arm and cam surface out of engagement with the elongated body, and thus out of clamping or gripping engagement thereagainst. The latch or arm locking means is easily disengaged by a slight pull upon the trigger arm, as in rapid or falling descent, even a slight misstep by the climber, to release the cam for immediate spring-biased engagement upon the elongated body, whereby the easy sliding unimpeded use of the clamping means by the climber is greatly enhanced without sacrifice of its safety utility.

In another aspect of this invention the sliding surface about the elongated body many be a channeled sleeve open at one side to fit about the elongated body and to provide a cam-receiving opening. Such sleeve may include means, such as a threaded or other manually fastenable flange at one end, whereby the sleeve may be removed from the clamped support by the housing and may be replaced with a larger or smaller channeled sleeve for the purposes of mounting about the elongated body through the opening at any selected height. The sleeve removably securable to the housing may be replaced by another sleeve member of varying size to accommodate a rope, cable, bar or the like of larger or smaller size, upon which the clamp is to be slidably mounted.

The invention is further described in relation to the drawings, wherein

FIG. 1 shows a schematic assembly of the clamping device upon an elongated body such as a rope or cable disposed adjacent to a ladder with a chain-like clamping means extending for engagement to the belt of the climber;

FIG. 2 is a side elevation of the clamping means about the elongated body such as a cable or rope;

FIG. 3 is a top plan view taken in the direction of the arrows 3—3 of FIG. 2;

FIG. 4 is a similar plan view taken on the line 4—4 of FIG. 2 and in section showing the disengaged position of the clamping element and locking means thereon as held out of engagement with the cable;

FIG. 5 is a view similar to FIG. 4 at the same level and taken on the line 5—5 of FIG. 4 showing the cam released for locking engagement against the cable;

FIG. 6 is a side elevation of the locking arm in clamped position with portions broken away and in section to show internal construction of the clamp with the cam and trigger in clamping position;

FIG. 7 is an end view taken in the direction of the arrows 7—7 of FIG. 6; and

FIG. 8 is an opposite end view taken in the direction of the arrows 8—8 of FIG. 6.

Referring to the several figures, the clamping means comprises a pair of side housing members 10 and 12 spaced for securement together at each end by a pair of bosses 14 and 16 through which the housing members are fastened together as by bolts or rivets 18, which secure the housing members together spaced to receive a trigger arm 20 supported therein for pivotal movement on a pivot 22. The pivot extending from side to side of the housings is fastened at opposite sides in a boss 23, whereby the trigger arm 20 can rotate on its pivot 22 in the direction of the arrows 24 by upward or downward movement of the extending arm tip 26. The trigger arm 20 is biased by one or more springs 42 mounted in an annular cup 44 with one end of spring 42 engaging the rim of the cup 44 and the other end 46 fastened to a housing face 10. In that construction the spring 42 biases the trigger arm in counterclockwise rotation on its pivot 22 in the direction of the arrow 52, as shown in FIG. 6.

The inner ends of the housing plates 10 and 12 are rounded to semi-cylindrical shapes 28 and 30 to secure and support therebetween a sleeve 32, as shown in FIG. 4. The sleeve 32 is cut away centrally to form a deep groove 34 bounded by side walls 36 and inner slanted gripping walls 38 to receive and house inner annular cam portion 40 of the trigger arm 20. The inner cam end 40 slides between the housing walls 10 and 12 and sleeve walls 36.

An elongated body 48, such as a rope, bar, cable or the like, is housed in the space 34 formed in the groove in the sleeve 32 and the clamping device fastens thereto. In clamping position, the end surface of the cam 40 may be concave to fit about and accommodate the annular surface of the cable 48. As shown in FIGS. 4, 5, and 6, the concave cam surface 50 bears frictionally against the cable 48 pressing it inward in pivotal downward movement of the trigger arm 20 in the direction of arrow 52, the cam surface pressing the cable or other elongated body against the inner slanted walls 38 of the channel or groove 34 in sleeve 32.

The sleeve 32 is gripped firmly by the curved housing walls 28 and 30 so that in released position of the cam when the trigger arm is moved clockwise, the cable will slide smoothly in the channel or groove 34 in unclamped free sliding movement therein. Upon assembly the sleeve 32 can be mounted held frictionally between the curved wall clamping ends 28 and 30, and the rivets 18 are set between the housing halves 10 and 12 whereby the sleeve 32 is firmly held in the position shown as in FIG. 4. The rivets 18 can be replaced with bolts, and moreover, the bosses 14 and 16 spacing the housing halves can be separated further by washers to a desired spacing to accommodate a larger sleeve 32 if desired and having a larger channel 34 for purposes of use with a larger cable or rope 48.

The sleeve 32 has flanges 54 above and below, resting upon the curved walls 28 and 30 at opposite ends for support of the sleeve, restraining it against longitudinal sliding movement under clamping stress. In alternate construction, the upper flange (as shown) and the lower flange (not shown) can be threaded as a separable element to the top of the annular sleeve as indicated by the dotted line position 56 shown in FIG. 5, so that the upper flange can be unscrewed and the sleeve driven out from between the supporting walls 28 and 30 of the housing sides, and another sleeve inserted for replacement and by refastening of the upper flange, threaded thereto, and whereby a larger channel or groove 34 may be provided in the sleeve in replacement, to accommodate a larger or smaller diameter cable 48. In that manner the clamp may be modified in size by replacement of a sleeve 32 to accommodate a cable of a larger or smaller size.

As stated, the spring 42 biases the trigger arm downward in the direction of the arrow 52 and into clamping engagement of its cam surface 40 with the rope or cable 48. According to the present invention, means are provided to hold the trigger arm and cam disengaged from clamping position despite the biasing pressure of the spring 42, holding it out of clamping engagement of the cam against the cable 48, as shown in FIGS. 2 and 4. For this purpose a small piston, detent or sliding bolt is provided preferably comprising a piston cup 58, usually having a cylindrical wall sized to slidingly fit in a cylinder 60 formed in the housing wall 10. The outer end of the piston surface 62 is spaced by a bar 78 and fastened to an operating knob 64, which is slidably mounted and guided in vertical movement in an opposite cylinder 66 bored in the housing wall 12. A spring 68 is disposed within the cylinder 60 bearing with one end 69 against the housing 10 and the other against the inner surface 70 of the piston cup 58. That construction with the spring in compression, biases the piston 58 outward of the cylinder 60, bearing against the inner surface of the housing 12 and cylinder 66 as a stop 72. In that position the knob 64 is extended and rests approximately flush with the outer surface of the cylinder 66. The bar 78 separates knob 64 and secures it to the surface of the piston 58 and spaces it apart therefrom providing an inner locking space 80 between the knob 64 and the upper surface 62 of the piston 58. A locking groove or cup 82, preferably semi-circular, is cut a short distance inward from an edge 21 of the trigger arm, near the upper surface. The cylindrical cup 82 (shown) is sized to fit slidingly about the outer surface of the piston 58. The cup 82 is cut to a depth sufficient to leave a locking web 84, sized about the length of the bar 78, to slidably fit into the space 80 between the surface 62 of the piston 58 and knob 64. The locking cup 82 is positioned radially along the edge 21 of the trigger arm 20 to be swung pivotally therewith against the piston 58 with the pivotal movement of the trigger arm on pivot 22. When the knob 64 is depressed inwardly against the pressure of the spring 68, depressing the knob to the inner cup position as shown in FIG. 5, the web portion 84 below the cup 82, fits in the space 80 and holds the trigger arm latched by the pressure of piston 58 thereon.

Consequently, upon depressing the knob 64 inward of the housing wall 12 to the position shown in FIG. 4 and rotation of the trigger arm 20 so that the web portion 84 fits in space 80, and is directly beneath the surface 62 of the piston 58, the spring 68 will hold the piston 58 in frictional engagement with the web portion 84 and hold the trigger arm 20 in the position of FIG. 4. In that upper raised position of the trigger arm 20 it will be observed in FIGS. 2 and 4, the cam 40 is out of engagement with the cable 48 and is so held by the spring 68 biasing the piston 58 against the surface of the web 84. The pressure of the spring 68 obviously will be great enough to hold the trigger arm frictionally therebeneath and out of engagement of the cam with the cable 48. The trigger arm may with slight manual pull be moved downward in the direction of the arrow 52 of FIG. 6, pulling the web 84 from beneath the spring-biased piston 58 releasing it from locked or frictionally engaged position, whereby the spring 42 then will fully bias the trigger arm 20 in the direction of the arrow 52, downward into clamping engagement of the cam 40 against the cable 48.

The trigger arm is easily set by manually pushing the knob 64 inward against its spring 68 by inserting a finger of the operator into the cylinder 66, pushing the knob 64 inward and simultaneously manually moving the trigger arm upward and clockwise, freeing the cam from locking engagement against the cable 48, allowing insertion of the web portion 84 into the space 80, with the tubular cutaway portion of the cup 82 surrounding and fitting about a portion of the cylinder 60, whereby the spring 68 biases the cylinder 60 into resiliently locking engagement of the trigger arm, holding the cam thereby out of clamping engagement upon the cable 48.

In normal use of the clamping device, a climber will ascend or descend a ladder 86 upward having the cable 48 disposed along its length. A belt 88 will normally be worn about the waist of the climber and a chain composed of as many links 90 as may be necessary to secure and support the climber to the belt is fastened to the outer end of the trigger arm 20, which may be bored at 92 to receive an end link of the chain 90. In ascending or descending movement it is useful to depress the knob 64 clamping the trigger arm 20 to an inoperative position of the clamp, whereby it will operate sliding easily and freely with the movement of the climber upward and downward of the ladder. In case of misstep or falling motion of the climber, the latching means will be normally biased against the cable by a spring 42, and grip the cable 48.

Certain modifications will occur to those skilled in the art and the clamp hereof may be modified along such lines. Accordingly, it is intended that the description hereof as given in the specification and shown in the drawings will be regarded as exemplary and not limiting except as defined in the claims.

I claim:

1. In a safety clamp, a housing for slidably mounting about an elongated body of the character of a rope, cable, bar, pipe or the like, and a clamping means for gripping said elongated body in clamped engagement thereon, said clamping means comprising a pivotally supported lever having one end extending outward thereof as a trigger arm for fastening to the body of the climber, whereby the safety device may be drawn slidingly upon said elongated body as the climber ascends or descends a ladder or the like near said elongated body, the inner end of said clamping means being shaped as a cam and adapted to grip said elongated body, firmly clamping thereagainst, and resilient means biasing sid cam and trigger arm into clamping engagement with said elongated body on its pivotal support, and latching means engaging said trigger arm in unclamped position, securing said trigger arm and cam out of clamping engagement with said elongated body to allow free sliding thereon in climbing movement of said climber.

2. The safety clamp as defined in claim 1 wherein said latching means comprises a resiliently biased element slidingly mounted to intercept a surface of said trigger arm, securing said arm against rotation on its pivot with the cam surface in disengaged position from the said elongated body.

3. The safety clamp as defined in claim 2 wherein said resiliently biased element is of the character of a piston, detent or sliding bolt.

4. The safety clamp as defined in claim 1 having a sleeve supported in one end of said housing and having a channel cut in said sleeve sized to slidingly fit about said elongated body, said channel being bound by side walls slidingly traversed by the inner cam-shaped end of said clamping means and bearing against said elongated body, pressing said body against the inner channel walls in gripping position thereof as the cam surface is rotated by said arm on its pivotal support.

5. The safety clamp as defined in claim 1 including a spring resiliently biasing said clamping means into clamping position against said elongated body in pivotal movement of said arm, said latching means being disposed to engage and latch to the surface of said trigger arm, in disengaged pivotal position of said cam surface gripping means, at a point radially disposed from its pivot position lightly securing said trigger arm out of clamping engagement against said elongated body.

6. The clamping device as defined in claim 4 wherein said sleeve is mounted in said housing replaceably with a selected channel position to slidingly accommodate the size of the elongated body.

7. A safety clamp for slidably mounting about an elongated body of the character of a rope, cable, bar, pipe or the like comprising housing members flared at one side to support and grip an elongated sleeve to slidingly receive the elongated body and having a channel open toward the center of the housing, said sleeve being supported between said housing members replaceably for selection of a sleeve to accommodate the diameter of the elongated body upon which it will slide, a pivot in said housing supporting a clamping means having one end cam-shaped and rotatable to bear against the surface of said elongated body in gripping engagement thereto, and the other end of said clamping means extending outward of said housing as a trigger arm for fastening to the body of a climber, means for resiliently biasing said cam-shaped surface on its pivot into biasing engagement with said elongated body, and means for holding said cam-shaped surface out of clamping position against said elongated body.

* * * * *